G. H. JACKSON.
Plow Fender.
No. 99,905. Patented Feb. 15, 1870.
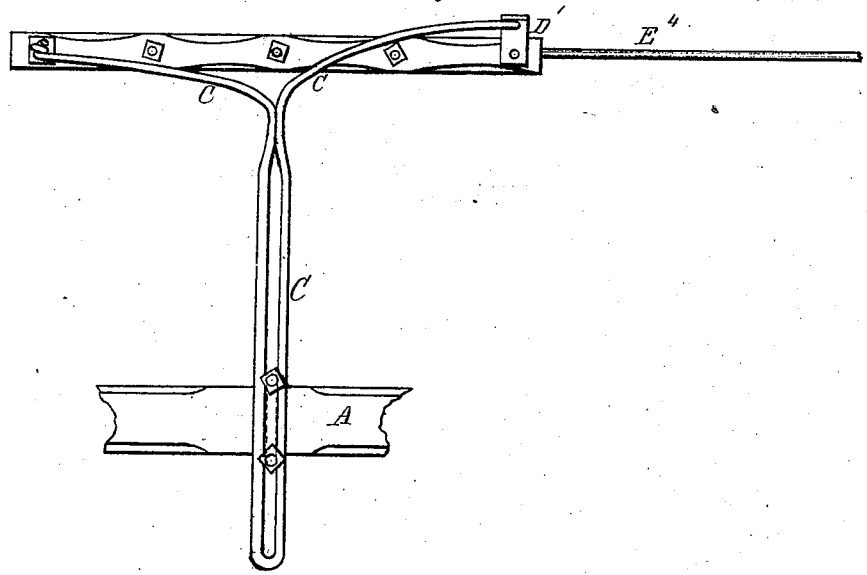
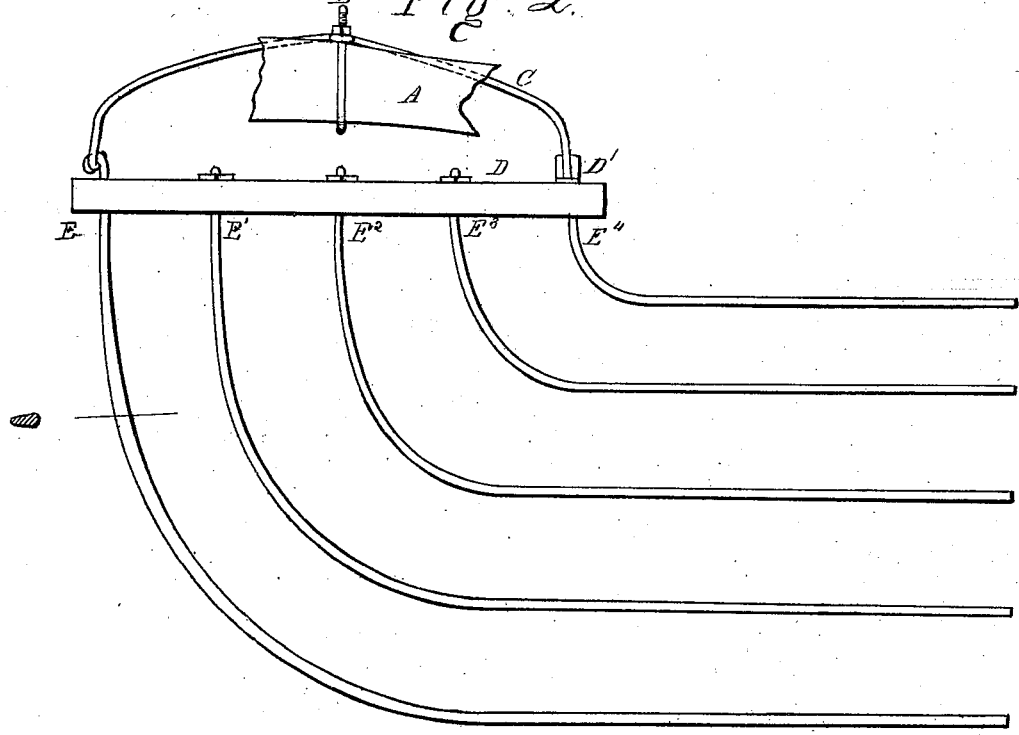
Witnesses
F. Clausen
A. Ruppert
Geo. H. Jackson
Inventor.
D. P. Holloway & Co
Att'y.

UNITED STATES PATENT OFFICE.

GEORGE H. JACKSON, OF COLLEGE CORNER, INDIANA.

IMPROVEMENT IN CLOD AND CORNSTALK FENDERS.

Specification forming part of Letters Patent No. 99,905, dated February 15, 1870; antedated February 5, 1870.

*To all whom it may concern:*

Be it known that I, GEORGE H. JACKSON, of College Corner, Jay county, Indiana, have invented a new and useful Improvement in Clod and Cornstalk Fenders; and I do hereby declare that the following is a full and exact description thereof, reference being had to the accompanying drawings, and to the letters of reference marked thereon.

Figure 1 is a plan or top view of my improved fender as it appears when attached to the beam of a plow; and Fig. 2 is a side elevation of the same, showing also a portion of the beam of the plow.

Corresponding letters refer to corresponding parts in both figures.

This invention relates to that class of devices which are to be attached to the beam of a plow for the purpose of preventing clods of earth, stones, cornstalks, and other substances from being thrown against and breaking down corn or other grain while being plowed among, such devices being denominated "clod" or "cornstalk" fenders.

The invention consists in the construction of the devices shown, as will be more fully described hereinafter.

In devices of this description, as heretofore constructed, a great difficulty has arisen from the fact that cross-bars thereof have caused them to become choked or clogged when in use by cornstalks, weeds, or grass of any kind with which they happen to come in contact when in use. The above-cited objection is removed in this case by dispensing with such rods or bars, and constructing a fender with rods running parallel with their line of motion, except at their forward ends, where they are carried upward, to enable them to be secured to a cross-beam or plate, to which they are all secured. As a consequence of this form of rods, any grass or weeds with which the front end comes in contact will be forced down and carried below the fender, and be covered with earth by the plow as it moves past the point where they are deposited.

By referring to the drawings it will be seen that A represents the beam of a plow, and that it is provided with a staple, B, which passes around it and through a slot in the arm C. This staple is provided with nuts upon its upper ends, which bear down upon the arm C, and thus hold it firmly in its position upon the plow-beam.

C represents an arm of metal, which may be constructed as shown in Fig. 1 of the drawings; or it may be a flat bar of iron having a slot in it to receive the upper ends of the staple B, and at its opposite ends branched or forked arms to receive and carry the fender. It will be seen that this arm may be so placed upon this beam as to cause the fender to be suspended at any required distance therefrom.

D represents a beam of wood, or it may be of metal, which, when in its proper position, is about parallel with, but some distance below, the beam of the plow. The beam is to be hinged to the outer forked ends of the arm C in such a manner as to be capable of swinging thereon, so that in the event of the bars of the fender coming in contact with any solid or immovable substance they may swing in toward the plow, and thus be prevented from being broken.

D' represents a right-angled piece of metal, which is to be secured to the rear end of the beam D, and directly above the point where the curved rod $E^4$ passes through such beam. The horizontal portion of this angled piece extends outward for a distance sufficient to enable it to secure the rear portion of the arm C outside of the bar D, where it is turned upward, or into a vertical position, in which direction it extends for, say, from three to six inches, said vertical portion resting against the arm C in such a manner as to prevent the fender from being swung out past a vertical position.

E E' $E^2$, &c., represent a series of rods of iron. The upper ends are of curved form, the degrees of curvature being such that each rod shall extend to the rear of the point at which it is secured to the bar D for a suitable distance, to prevent the clods of earth which may be raised by the plow from being thrown upon the rows of stalks of corn or other crop which is being cultivated. It follows that each of these rods requires a different degree of curvature, and that such curvature will require to be at a different part in the rod, so that the distance at which they are placed from each other in securing them to the bar D may be preserved throughout their entire length, as shown in Fig. 2.

Having thus described my invention, what I claim, and desire to secure by Letters Patent, is—

A clod-fender combining in its construction a series of rods curved in such a manner that their rear ends shall assume a horizontal position, a bar or beam to which the rods are secured, an angled iron for securing the fender in position, and an arm for securing the fender to the beam of a plow, substantially as and for the purpose set forth.

In testimony whereof I have signed my name to this specification in the presence of two subscribing witnesses.

GEORGE H. JACKSON.

Witnesses:
JOHN S. STANTON,
GEORGE K. ADAIR.